(12) United States Patent
Matsufuji et al.

(10) Patent No.: US 6,199,653 B1
(45) Date of Patent: Mar. 13, 2001

(54) FOUR-WHEEL DRIVEN VEHICLE

(75) Inventors: Mizuya Matsufuji; Masahisa Kawamura, both of Amagasaki (JP)

(73) Assignee: Kanzaki Kokyukoki Mfg. Co., Ltd., Hyogo-Ken (JP)

( * ) Notice: Subject to any disclaimer, the term of this patent is extended or adjusted under 35 U.S.C. 154(b) by 0 days.

(21) Appl. No.: 09/197,209

(22) Filed: Nov. 20, 1998

(30) Foreign Application Priority Data

Dec. 19, 1997 (JP) .................................................. 9-351532
Jul. 2, 1998 (JP) ................................................. 10-187144

(51) Int. Cl.$^7$ ................................................. B60K 17/34
(52) U.S. Cl. .......................... 180/233; 180/247; 180/248; 74/15.4; 192/87.15
(58) Field of Search .................................. 280/247, 248, 280/249, 250; 701/89; 192/87.15; 74/15, 15.4, 359, 333; 180/233

(56) References Cited

U.S. PATENT DOCUMENTS

| | | | |
|---|---|---|---|
| 3,926,288 | * 12/1975 | Nerstad | 192/104 F |
| 4,669,559 | 6/1987 | Fukui | 180/6.24 |
| 4,696,365 | 9/1987 | Ishimori et al. | 180/233 |
| 4,723,623 | 2/1988 | Teraoka et al. | 180/233 |
| 4,823,648 | * 4/1989 | Hayakawa et al. | 74/869 |
| 4,856,611 | 8/1989 | Teraoka et al. | 180/233 |
| 4,862,988 | 9/1989 | Umemoto | 180/246 |
| 5,024,306 | * 6/1991 | Fukui et al. | 192/3.57 |
| 5,080,641 | * 1/1992 | Kobayashi | 475/249 |
| 5,248,284 | * 9/1993 | Kobayashi et al. | 475/86 |
| 5,293,956 | 3/1994 | Onishi | 180/233 |
| 5,651,288 | * 7/1997 | Meeusen | 74/333 |

* cited by examiner

Primary Examiner—Brian L. Johnson
Assistant Examiner—Daniel Yeagley
(74) Attorney, Agent, or Firm—Sterne Kessler, Goldstein & Fox P.L.L.C.

(57) ABSTRACT

A four-wheel driven wheel has a rear-wheel driving system branching at the intermediate thereof into a front-wheel driving system comprising a first transmission for driving the front wheels at a peripheral speed substantially identical with that of the rear wheels and a second transmission for driving the front wheels at a peripheral speed higher than that of the rear wheels. A hydraulic clutch device is provided, including a hydraulically operable first friction clutch for connecting and separating the first transmission with the rear-wheel driving system, a hydraulically double-acting first piston for engagement and disengagement of the first friction clutch, a first fluid chamber for the clutch-engaging action provided at one side the first friction clutch, a second fluid chamber for the clutch-disengaging action provided at the other side thereof, and a biasing member for biasing the first friction clutch to engage disposed in the first chamber. A second clutch device is also provided including a hydraulically operable second friction clutch for connecting and separating the second transmission with the rear-wheel driving system, a hydraulically single-acting second piston for engagement of the second friction clutch, and a third piston provided at one side of the second piston for the clutch-engaging action thereof. A directional control valve is provided which is operable to be put into one of three positions: a first position wherein fluid is supplied to the first chamber; a second position wherein fluid is supplied to the second chamber; and a third position wherein fluid is supplied to the third chamber.

14 Claims, 9 Drawing Sheets

FOUR-WHEEL DRIVEN VEHICLE

BACKGROUND OF THE INVENTION

1. Field of the Invention

The present invention relates to a four-wheel driven vehicle provided with a front wheel driving system. One of three (3) modes may be selected. A two-wheel drive (2WD) mode in which on only rear wheels are driven, a first four-wheel drive (F4WD) mode in which the front wheels are driven together with the rear wheels at a peripheral speed substantially identical with that of the rear wheels, and second four-wheel drive (S4WD) mode in which the front wheels are driven together with the rear wheels at a peripheral speed higher than that of the rear wheels.

2. Related Art

A conventional agricultural tractor serving as a four-wheel driven vehicle, whose front and rear wheels rotate at a nearly equal peripheral speed are described in U.S. Pat. Nos. 4,669,559, 4,696,365, 4,723,623, 4,856,611, 4,862,988, and 5,293,956. Such a conventional tractor has the problem that, when hard cornering at the end of field during work such as cultivation, the rotation of its front wheels is too slow to follow the turning of the tractor, whereby the front wheels slip and damage the field. Recently, to avoid such damage to the field, a front wheel speed-up system has been employed by the four-wheel driven vehicle to increase the rotational speed of the front wheels and enable them to follow the turning of the vehicle without slip during hard cornering.

The conventional front wheel speed-up system is provided with a speedup clutch whose engagement makes the rotational speed of front wheels higher. The speed-up clutch is mechanically made to engage by the rotational force of a steering wheel when being steered beyond a predetermined angle. Alternatively, the speed-up clutch is engaged by an actuator when a sensor disposed at the steering wheel or on linkage between the steering wheel and the front wheels detects steering beyond the predetermined angle. The latter speed-up clutch consists of two hydraulic clutches; one of them adapted to engage for driving the front wheels at a nearly identical peripheral speed with that of rear wheels and the other adapted to engage for driving them at a higher peripheral speed. When each of the hydraulic clutches is operated to engage, a hydraulic pressure is applied to the clutch so as to make it engage. When it is operated to disengage, pressure oil is drained so as to release the hydraulic pressure and the biasing force of a spring makes the clutch disengage.

The mechanical speed-up clutch requires a large force for steering due to its mechanical structure. The latter speed-up clutch, which is switchable according to detection of steering angle by the sensor, has the fault that, when the electric or hydraulic system for the clutches malfunctions, both the clutches disengage and the vehicle is goes into 2WD mode, thereby lacking traction power. Also, it requires a large capacity for transmitting power into the front wheels, thereby requiring relatively large clutches which increases the space required for the clutches.

SUMMARY OF THE INVENTION

The object of the present invention is to provide a new and improved four-wheel driven vehicle, which has a pair of rear wheels driven all the time and are operable to be put into one of three driving modes: a two-wheel drive (2WD) mode in which only the rear wheels are driven; a first four-wheel drive (F4WD) mode in which the front wheels are driven at a peripheral speed substantially identical with that of the rear wheels; and a second four-wheels drive (S4WD) mode in which the front wheels are driven at a peripheral speed higher than that of the rear wheels, wherein an operator can select between 2WD and F4WD modes, the driving mode can be automatically changed into F4WD mode on the operation of braking both the rear wheels even if it is in 2WD mode, and the driving can automatically be changed into S4WD mode upon steering beyond a predetermined angle while it is in F4WD mode, and wherein the driving mode changing means is compact.

To achieve the object, a rear-wheel driving system branches at the intermediate thereof into a front-wheel driving system comprising a first transmission for driving the front wheels at a peripheral speed substantially identical with that of the rear wheels and a second transmission for driving the front wheels at a peripheral speed higher than that of the rear wheels.

A hydraulically operable first friction clutch is provided for connecting and separating the first transmission with the rear-wheel driving system. A hydraulically double-acting first piston is provided to engage and disengage the first friction clutch. The first piston is provided with a first fluid chamber at one side for the clutch-engaging action thereof and a second fluid chamber at the other side for the clutch-disengaging action thereof. A biasing member for biasing the first friction clutch to engage is disposed in the first chamber.

A hydraulically operable second friction clutch is provided for connecting and separating the second transmission with the rear-wheel driving system. A hydraulically single-acting second piston is provided to engage the second friction clutch. The second piston is provided with a third fluid chamber at one side for the clutch-engaging action thereof.

The front-wheel driving system further comprises a directional control valve which is operable to be put into one of three positions: a first position for supplying fluid to the first chamber; a second position for supplying fluid to the second chamber; and a third position for supplying fluid the third chamber.

The directional control valve is shifted to the first position for F4WD mode, so that the pressure of the fluid from the directional control valve is generated in the first chamber in addition to the biasing force of the biasing member therein, whereby the first piston acts to make the first friction clutch engage. The directional control valve is shifted to the second position for 2WD mode, so that the pressure of the fluid from the directional control valve is generated in the second chamber and applied to the first piston against the biasing force of the biasing member so as to make the first friction clutch disengage. The directional control valve is shifted to the third position for S4WD mode, so that the pressures of the fluid from the directional control valve are generated in the second and third chambers, whereby the hydraulic pressure in the second chamber is applied to the first piston so as to make the first friction clutch disengage and the hydraulic pressure in the third chamber is applied to the second piston so as to make the second friction clutch engage.

When both left and right rear wheels are braked in 2WD mode, the directional control valve is changed from the second position to the first position, thereby changing the driving mode into F4WD.

Also, when the vehicle is steered beyond the predetermined angle in F4WD mode, the directional control valve is changed from the first position to the third position, thereby changing the driving mode into S4WD.

Furthermore, the directional control valve is provided with a first solenoid and a second solenoid. When the first solenoid is energized, the directional control valve is put to the second position. When the second solenoid is energized, it is put to the third position. When neither the first solenoid nor the second solenoid is energized, it is put to the first position.

Due to the above mentioned construction, the first friction clutch engages for F4WD by the hydraulic pressure force and the biasing force of the biasing member together generated in the first chamber, so that the capacity of the first friction clutch can be reduced and the construction of the device including the first friction clutch can be compacted so as to reduce the space required for it.

Also, even if the hydraulic or electric system for controlling the driving of the front wheels malfunctions, the directional control valve stays in the first position for F4WD mode, so that the first friction clutch engages by the biasing force of the biasing member in the first chamber, thereby preventing reduction in the traction power of the vehicle.

Also, since the directional control valve in the fluid circuit for the first and second friction clutches can be switched without reducing the pressure within the circuit, the whole of fluid within the circuit is kept at a constant pressure, thereby improving the acting replication of clutches.

With those and other objects in view, the present invention consists in the construction hereinafter fully described, illustrated in the accompanying drawings, and set forth in the claims appended hereto, it being understood that various changes in the operation, form, proportion and minor details of construction, within the scope of the claims, may be resorted to without departing from the spirit of the invention or sacrificing any of the advantages thereof.

DETAILED DESCRIPTION OF THE PREFERRED EMBODIMENTS

Figure 1:
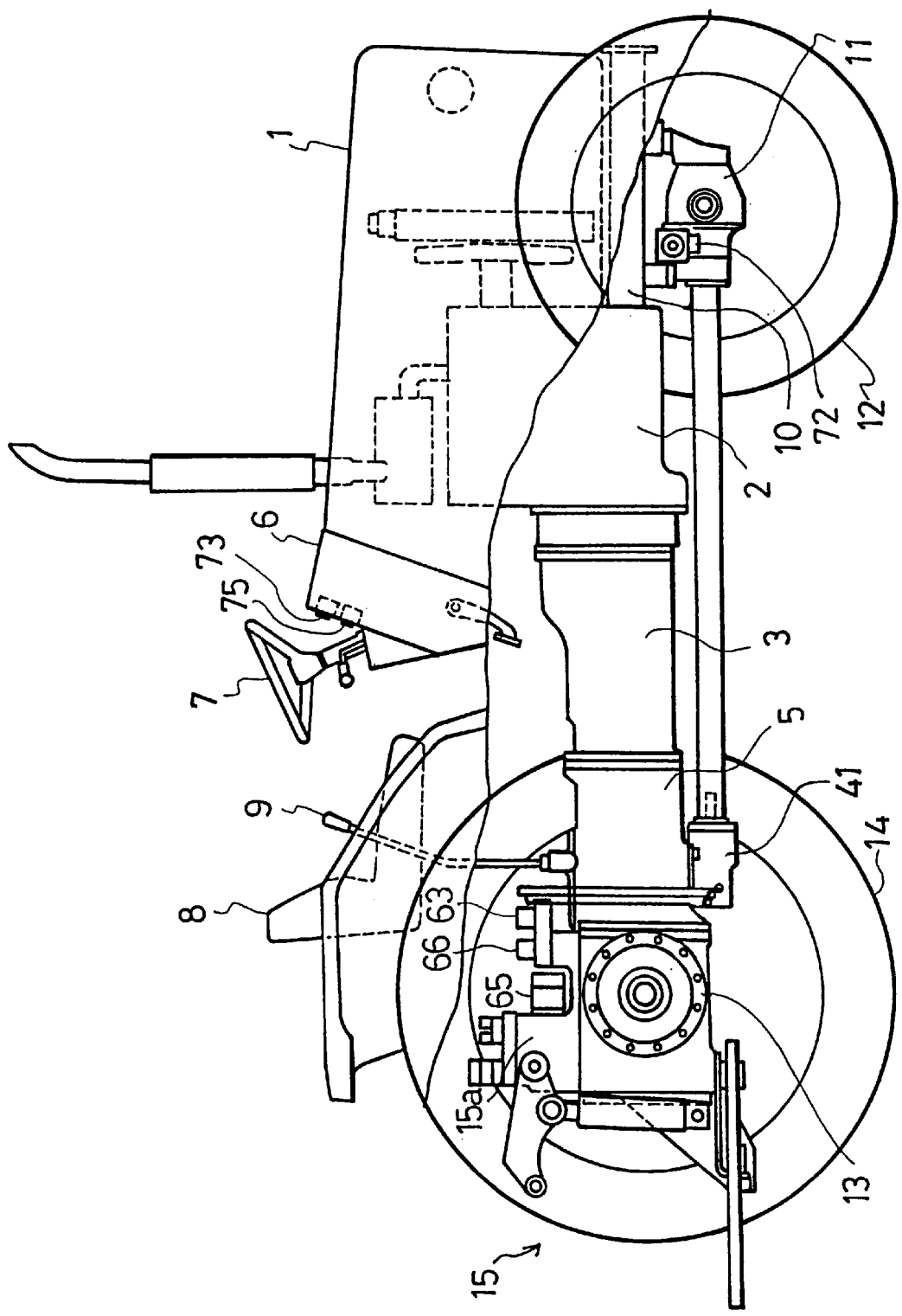
FIG. 1 is a whole side view of a tractor serving as a four-wheel driven vehicle employing a front-wheel driving system according to the present invention.

Referring to FIG. 1, explanation will be given on a tractor serving as a four-wheel driven vehicle including a front-wheel driving system according to the present invention.

An engine 2 is supported by a front frame 10 disposed at the front portion of the vehicle body, housed in a bonnet 1. Rearward from the rear end of engine 2 are arranged a clutch housing 3, a transmission casing 5 and a rear transaxle casing 13, which are continuously joined with each other, in a longitudinal direction.

A dashboard 6 is disposed behind bonnet 1 and provided thereabove with a steering wheel 7. An operator's seat 8 is disposed above a transmission casing 5 behind steering wheel 7. A main speed changing lever 9, a lifting and lowering lever for an attached working machine and the like are disposed beside seat 8.

A front axle casing 11 is disposed under front frame 10 so as to support left and right front wheels 12 on both sides thereof. Rear transaxle casing 13 supports left and right rear axles through a differential unit therein. Left and right rear wheels 14 are fixed onto the outer ends of left and right rear axles.

A hydraulic lifting casing 15a housing a working machine lifting device 15 is mounted on the upper surface of rear transaxle casing 13.

Figure 2:
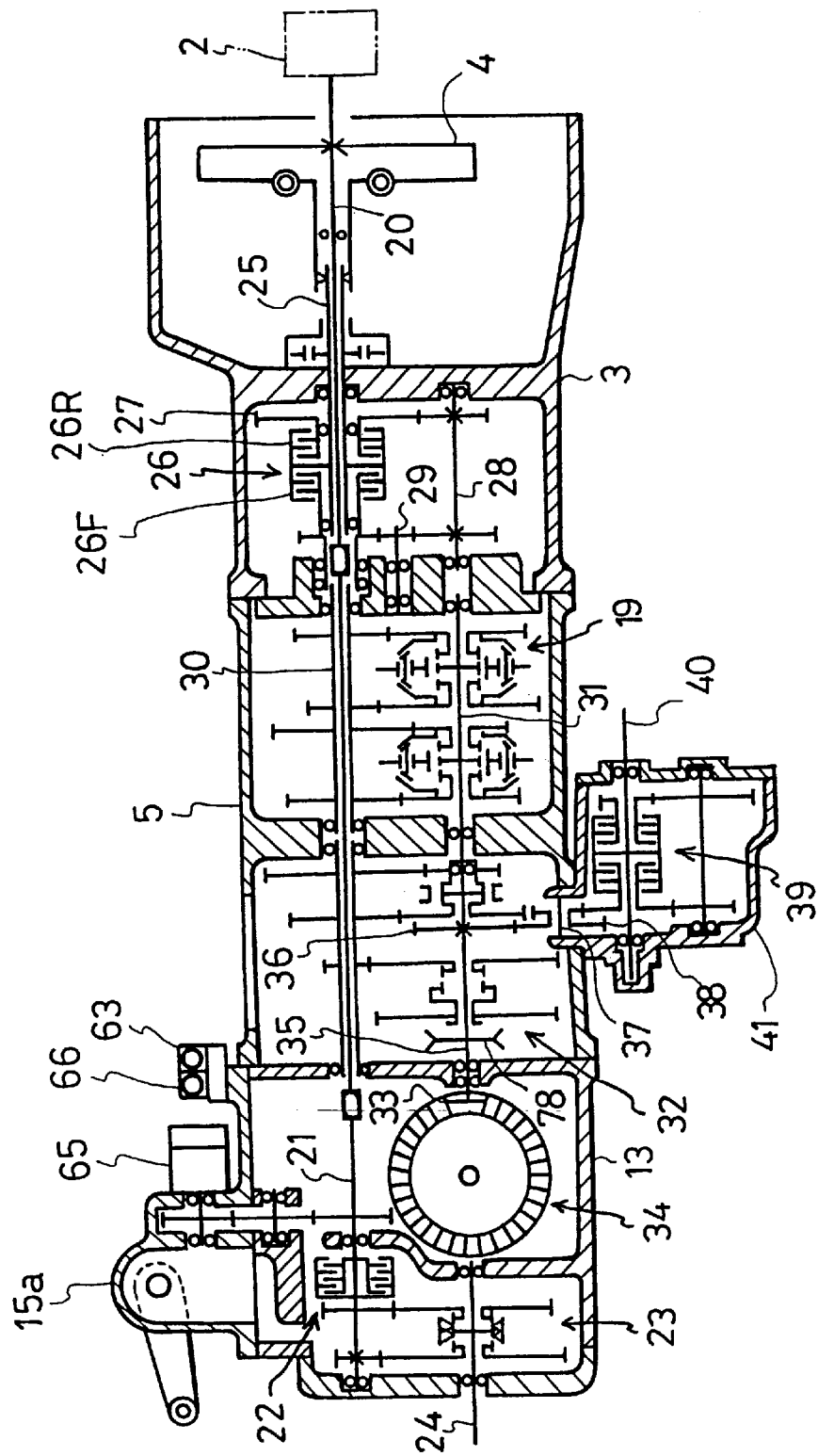
FIG. 2 is a diagram of the transmission system within a transmission casing.

Next, explanation will be given on the inner construction of clutch housing 3, transmission casing 5 and rear transaxle casing 13 according to FIG. 2. A PTO input shaft 20 directly connected to the output shaft of engine 2 is extended rearwardly through the interior of clutch housing 3 and so as to be directly connected to a PTO transmission shaft 21 in transmission casing 5. A PTO transmission shaft 21 is drivingly connected with a rear PTO shaft 24 projecting rearwardly from the rear surface of rear transaxle casing 13 through a PTO clutch 22 and a PTO transmission 23.

In clutch housing 3, a cylindrical travelling input shaft 25 is coaxially provided around PTO input shaft 20 so as to receive the power from engine 2 through the damper joint of flywheel 4. A power reverser 26 is provided around the rear portion of travelling input shaft 25. For travelling in advance, an advancing clutch 26F of power reverser 26 engages so as to directly connect travelling input shaft 25 with a cylindrical speed-change driving shaft 30 relatively-rotatably disposed around PTO transmission shaft 21, thereby rotating speed-change driving shaft 30 regularly. For travelling in reverse, a reversing clutch 26R of power reverser 26 engages, so as to connect travelling input shaft 25 with a reversing clutch gear 27. Reversing clutch gear 27 engages with a gear of a counter shaft 28. Counter shaft 28 engages with a reversing shaft 29 through gears and reversing shaft 29 engages with speed-change driving shaft 30 through gears, so that the rotation of travelling input shaft 25 is transmitted to speed-change driving shaft 30 through counter shaft 28 and reversing shaft 29, thereby rotating speed-change driving shaft 30 reversely.

The interior of transmission casing 5 is divided into front and rear chambers. In the front chamber is constructed a main speed-changing unit 19. In this regard, a plurality of driving gears are fixed on speed-change driving shaft 30 and a plurality of driven gears are rotatably provided on a main speed-changing shaft 31, so that the driving gears on speed-change driving shaft 30 engage respective driven gears on main speed-changing shaft 31, thereby bringing multi-speed stages (in this embodiment, four speed stages). A plurality of synchromesh clutches (in this embodiment, a pair of clutches, each of which is interposed between two juxtaposed driven gears on shaft 31) are constructed around main speed-changing shaft 31 to selectively operate to fix one of driven gears on shaft 31.

In the rear chamber of transmission casing 5 is constructed a sub speed-changing unit 32, so that the rotary power of main speed-changing shaft 31 is transmitted to a travelling output shaft 35 through sub speed-changing unit 32. The rotary power of travelling output shaft 35 is further transmitted from a pinion 33 provided on the rear end of travelling output shaft 35 to rear wheels 14 through a differential unit 34 in rear transaxle casing 13.

A braking pulley 78 is provided on travelling output shaft 35 for forming a belt-type parking brake. When a hand lever or a pedal (not shown) for parking lock, which is provided on an operator's portion of the vehicle, is operated, a fixing belt (not shown) is pressed against braking pulley 78 so as to make travelling output shaft 35 not rotatable.

Each transmission system between each of rear wheels 14 and differential unit 34 includes a usual braking device (not shown), each braking device being connected to each of left and right turn-brake pedals juxtaposed on a left floor of an operator's portion of the vehicle. When one of the turn-brake pedals is trod, the braking device connected to the trod pedal brakes one of rear wheels 14, so as to turn the vehicle by rotation of non-braked rear wheel 14. When both the turn-brake pedals are trod, both the braking devices brake respective rear wheels 14 simultaneously so as to stop the vehicle.

The rotary power of travelling output shaft 35 is also transmitted from a front-wheel driving power take-out gear 36 fixed on travelling output shaft 35 to a front-wheel transmission unit 39 through a gear 38 rotatably provided on a counter shaft 37. The front-wheel transmission unit 39 selectively brings the driving mode of the vehicle into one of three modes consisting of a two-wheel drive (2WD) mode in which only rear wheels 14 are driven, a first four-wheel drive (F4WD) mode in which front wheels 12 are driven together with rear wheels 14 at a substantially equal peripheral speed, and a second four-wheel drive (S4WD) mode in which front wheels 12 are driven together with rear wheels 14 at a peripheral speed higher than that of rear wheels 14. In F4WD or S4WD modes, power is transmitted from a front-wheel driving output shaft 40 of front-wheel transmission unit 39 into front axle casing 11 through universal joints, thereby driving front wheels 12.

Figure 3:
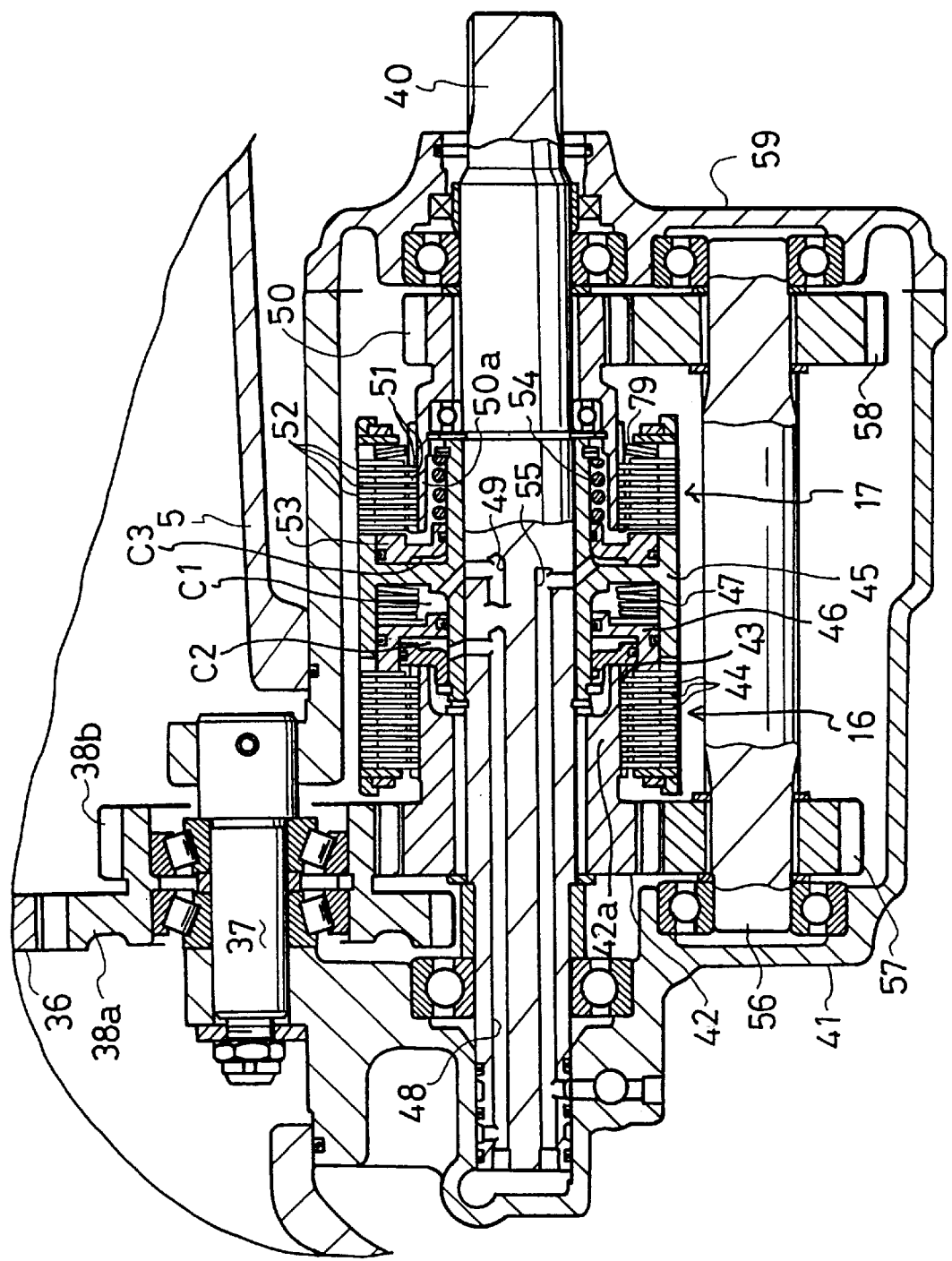
FIG. 3 is a sectional side view of the front-wheel transmission unit.
Figure 4:
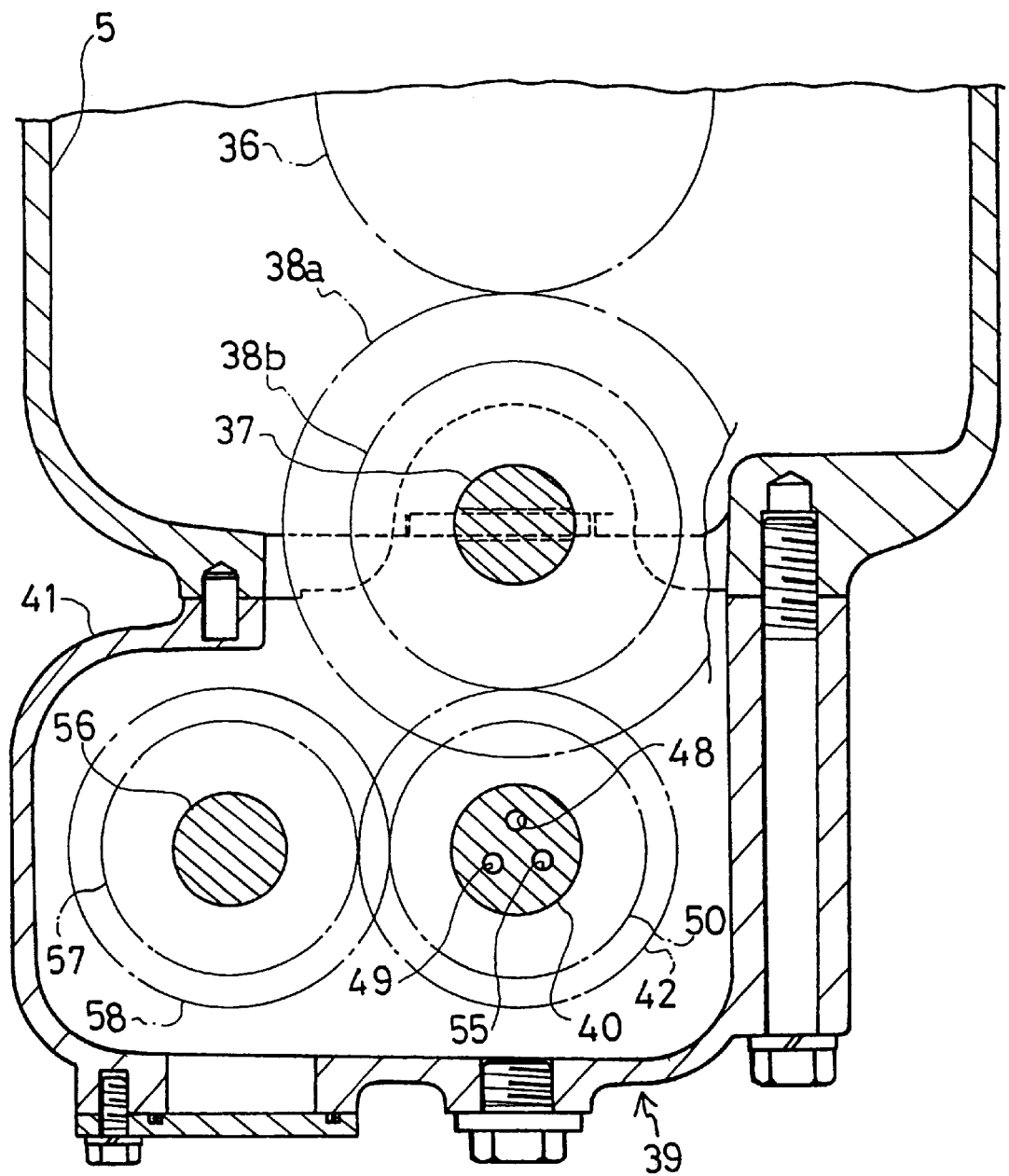
FIG. 4 is a sectional front view of the same.
Figure 5:
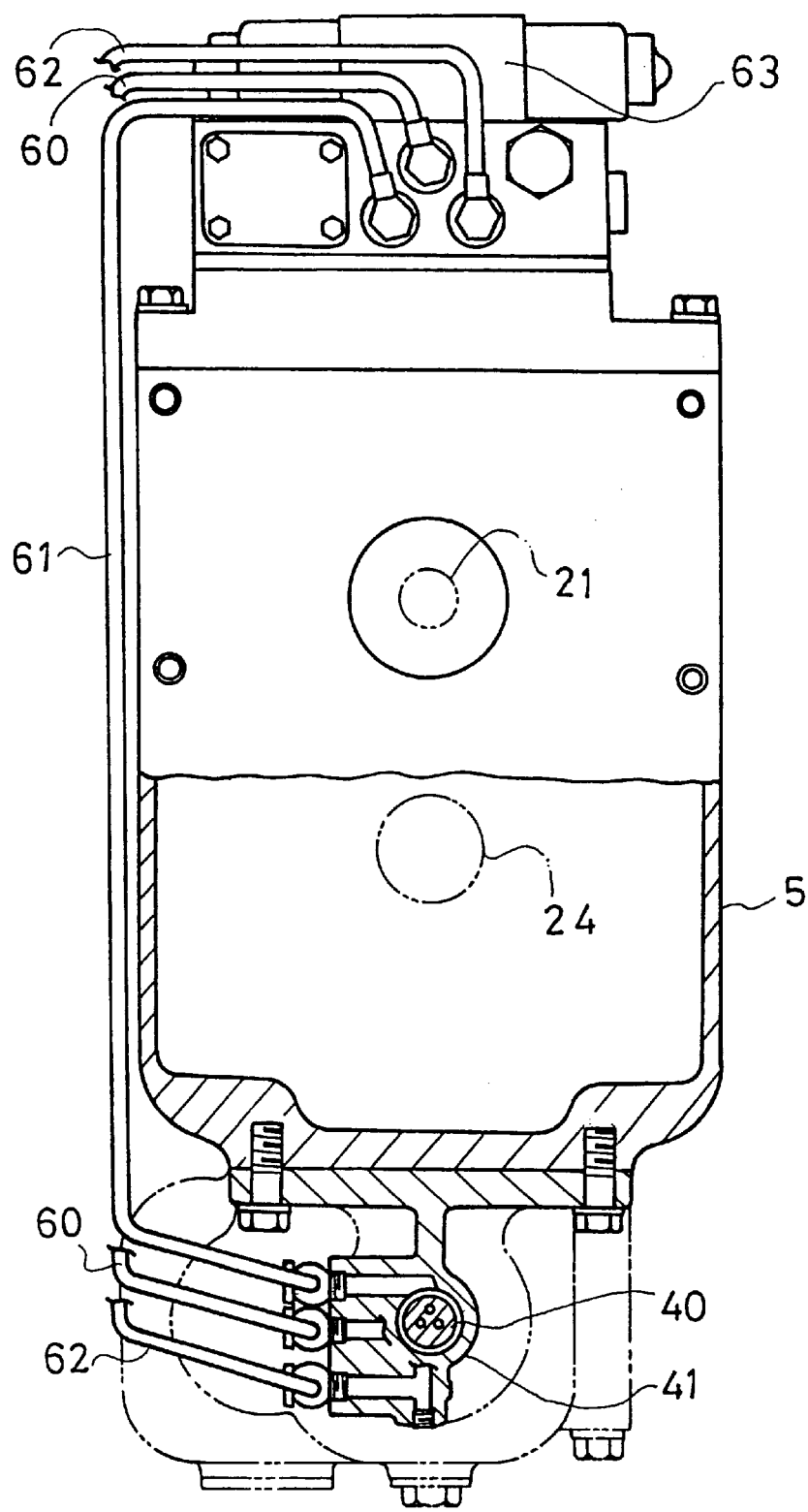
FIG. 5 is a sectional front view of a condition of connection between a front-wheel transmission unit and a directional control valve.
Figure 6:
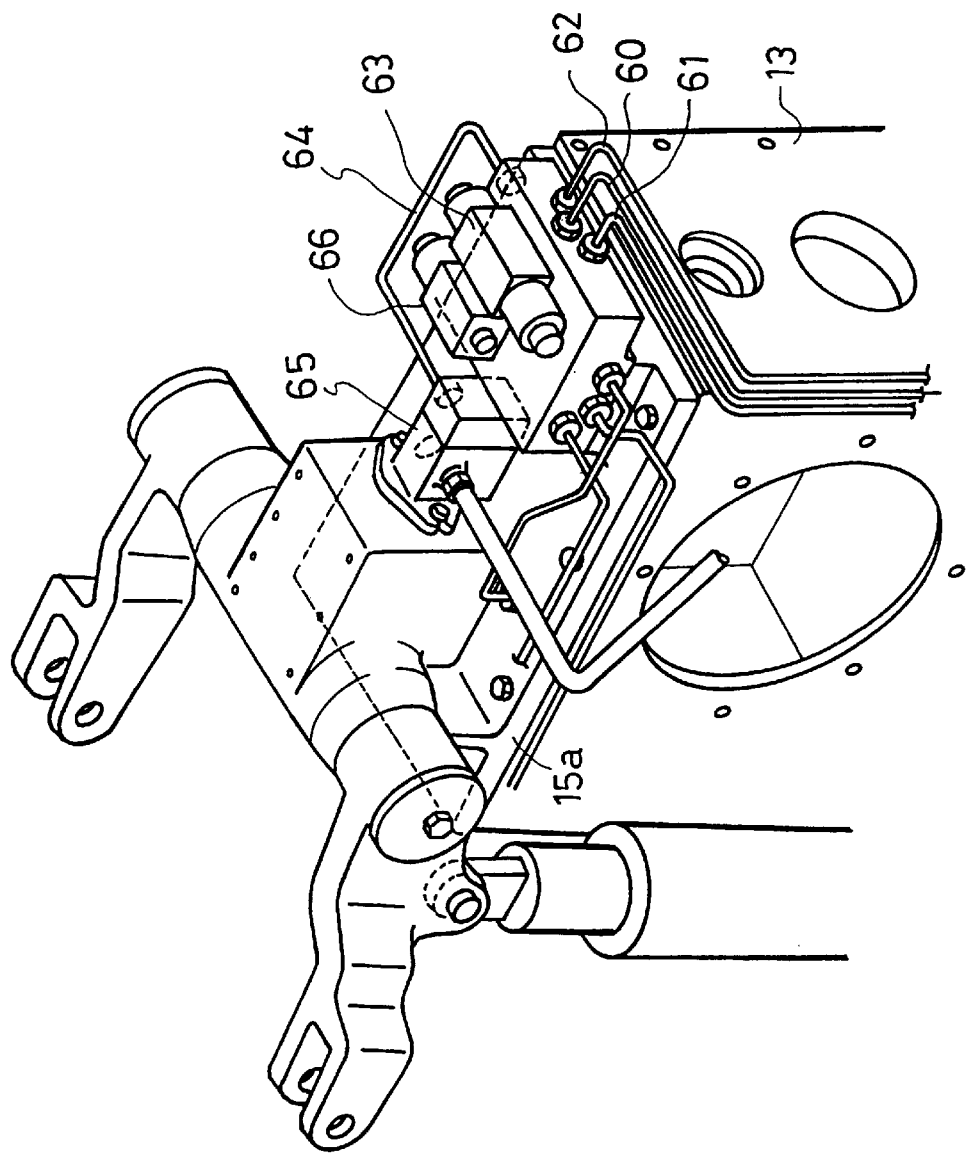
FIG. 6 is a perspective view of the upper portion of a rear transaxle casing with the directional control valve disposed thereon.

Referring to FIGS. 3 and 4, there is shown the construction of front-wheel transmission unit 39. A front-wheel transmission casing 41 is fixed onto the bottom surface of transmission casing 5. A counter shaft 37 is pivoted onto the upper portion of front-wheel transmission casing 41 so as to face the interior of transmission casing 5. The front surface of front-wheel transmission casing 41 is closed with a lid 59. Between lid 59 and front-wheel transmission casing 41 are rotatably supported longitudinal front-wheel driving output shaft 40 and counter shaft 56 in parallel. Double gears 38 are rotatably supported on counter shaft 37 through a bearing. A large diametric gear 38a as one of double gears 38 engages with front-wheel driving take-out gear 36 fixed on travelling output shaft 35. A small diametric gear 38b as the other of double gears 38 engages with a gear 42 rotatably provided on front-wheel driving output shaft 40.

A clutch casing 45 is fixed on front-wheel driving output shaft 40. Clutch casing 45 forms a rear double-acting cylinder and a front single-acting cylinder when viewed in the longitudinal direction of shaft 40. A boss portion 42a of gear 42 is integrally extended into the double-acting cylinder along shaft 40, so that a plurality of friction plates 43 engage with the periphery of boss portion 42a so as to be not relatively-rotatable and axially-slidable. A plurality of friction plates 44 engage with the double-acting cylinder of clutch casing 45 so as to be not relatively-rotatable and axially slidable. Each of friction plates 43 is disposed adjacent to each of friction plates 44, so that friction plates 43 and 44 overlap when viewed in front.

The double-acting cylinder formed by clutch casing 45 houses therein a first piston 46 for pressing and separating friction plates 43 and 44 serving as a first friction clutch 16. The double-acting cylinder comprises a first chamber C1 and second chamber C2 disposed before and behind first piston 46, respectively.

First chamber C1, which is adapted to be filled with oil for actuating first piston 46 to press friction plates 43 and 44, houses a biasing member 47 consisting of leaf springs for biasing friction plates 43 and 44 so as to engage. Oil bores 48 and 49 are bored in front-wheel driving output shaft 40 so as to be connected to respective first and second chambers C1 and C2.

First friction clutch 16 consisting of friction plates 43 and 44 provided for F4WD mode disengages when oil is supplied into second chamber C2 and engages so as to connect gear 42 with front-wheel driving output shaft 40 when oil is supplied into first chamber C1.

A gear 50 is rotatably provided on front-wheel driving output shaft 40 in front of clutch casing 45, so as to integrally extend a boss portion 50a thereof into the single-acting cylinder of clutch casing 45 along shaft 40. A plurality of friction plates 51 engage with the periphery of boss portion 50a so as to be not relatively-rotatable and axially-slidable. A plurality of friction plates 52 engage the single acting cylinder of clutch casing 45 so as to be not relatively rotatable and axially-slidable. Each friction plate 51 is disposed adjacent to each friction plate 52, so that friction plates 51 and 52 overlap when viewed in front. The single-acting cylinder formed by clutch casing 45 houses therein a second piston 53 for pressing friction plates 51 and 52 serving as a second friction clutch 17. Second piston 53 is biased by a spring 54 disposed out of the single-acting cylinder so as to make friction plates 51 and 52 disengage. An oil bore 55 is bored in the axial portion of front-wheel driving output shaft 40 so as to be connected to a third chamber C3 of the single-acting cylinder.

Second friction clutch 17 consisting of friction plates 51 and 52 engages when oil is supplied into third chamber C3 and disengages when oil is drained from third chamber C3.

A biasing member 79 consisting of two leaf springs abutting against each other is disposed opposite to second piston 53 with respect to friction plates 51 and 52. Biasing member 79 biases friction plates 51 and 52 toward piston 53, thereby reducing the gap between piston 53 and adjacent friction plate 51 or 52 to close it as soon as possible. Accordingly, second piston 53 acts to press friction plates 51 and 52 to make second friction clutch 17 engage as soon as it receives the hydraulic pressure from third chamber C3, thereby enabling the changing from 2WD mode to F4WD mode to be performed smoothly. In addition, the biasing member 79 cushions the movement of second piston 53 pressing friction plates 51 and 52, thereby absorbing the shock of engagement of second friction clutch 17.

Gears 57 and 58 are fixed before and behind on a counter shaft 56 in parallel to front-wheel driving output shaft 40. Gears 57 and 58 engage with gears 42 and 50, respectively. The drive ratio of gears 42, 57, 58 and 50 is set to make the peripheral speed of front wheels 12 approximately twice as much as that of rear wheels 14.

Due to such construction, if pressure oil is supplied into oil bore 49, first piston 46 slides in the direction for applying the pressing force added to the biasing force of biasing member 47 to friction plates 43 and 44, so as to make first friction clutch 16 engage, thereby transmitting power from travelling output shaft 35 to front wheel driving output shaft 40 through gears 38a, 38b and 42, whereby the vehicle travels in F4WD mode where front wheels 12 are driven at a peripheral speed substantially identical with that of rear wheels 14.

If pressure oil is supplied into oil bore 48, first piston 46 slides against the biasing force of biasing member 47 in the direction for separating friction plates 43 and 44, so as to make first friction clutch 16 disengage, thereby bringing the driving mode to 2WD mode where only rear wheels 14 are driven. In this case, there is improvement in fuel economy in comparison with F4WD mode.

If pressure oil is supplied into oil bore 55 during the disengagement of first friction clutch 16, second piston 53 slides against the biasing force of spring 54 for pressing friction plates 51 and 52, so as to make second friction clutch 17 engage, wherein the power received by gear 42 is transmitted to front-wheel driving output shaft 40 through gear 57, counter shaft 56 and gears 58 and 50, thereby placing the vehicle in S4WD mode in which front wheels 12 are driven at a higher peripheral speed than rear wheels 14.

As shown in FIGS. 3 and 4, rotary joints are formed in the rear half portion of front-wheel driving output shaft 40 which are respectively open to oil bores 48, 49 and 55. As shown in FIGS. 4 through 7, a directional control valve 63 is disposed on the upper portion of hydraulic lifting casing 15a and is connected with oil conduits 60, 61 and 62 which are connected to the respective rotary joints, so that oil conduits 60, 61 and 62 are communicated with oil bores 48, 49 and 55, respectively. A hydraulic pump 65 is also disposed on hydraulic lifting casing 15a and is connected with directional control valve 63 in front thereof through discharge oil conduit 64. As shown in FIG. 2, hydraulic pump 65 is driven by power transmitted through the gear train from PTO transmission shaft 21. Reference numeral 66 shown in FIG. 6 designates as an electromagnetic valve for acting PTO clutch 22.

Figure 7:
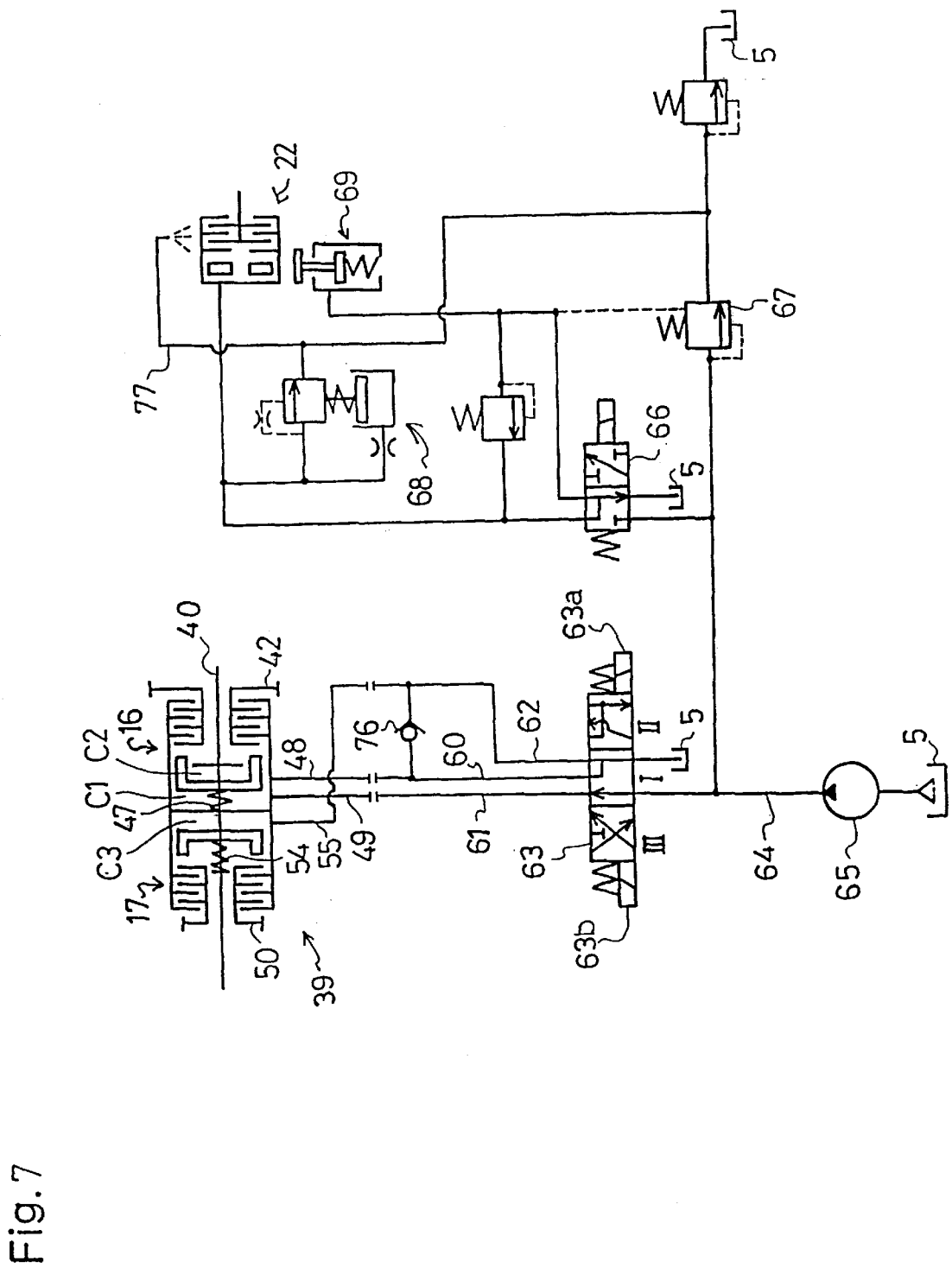
FIG. 7 is a fluid circuit for the front-wheel driving control unit.

Referring to FIG. 7, there is shown a fluid circuit for controlling first friction clutch 16 and second friction clutch 17. Discharge oil conduit 64 from hydraulic pump 65 branches two ways, one connected to directional control valve 63 and the other connected to an oil supplying circuit for a PTO driving unit. The pressure of oil led into directional control valve 63 through discharge oil conduit 64 is limited by a relief valve 67 and is selectively led into one of oil conduits 60, 61 and 62 connected to respective discharge ports of directional control valve 63. In other words, the engagement and disengagement of first and second friction clutches 16 and 17 is controlled by switching of directional control valve 63, thereby selecting one of three driving modes that are 2WD, F4WD and S4WD.

As shown in FIG. 7, in the oil supporting circuit for the PTO driving unit, electromagnetic valve 66 is connected at the suction port thereof to the primary side of relief valve 67 and at the discharge port thereof to a PTO brake 69 and PTO clutch 22. The hydraulic pressure for acting PTO clutch 22 is limited by a delay relief valve 68. The secondary side of delay relief valve 68 is connected to a lubricating oil circuit 77 for lubricating PTO clutch 22.

PTO brake 69 suppresses a housing of PTO clutch 22 by biasing force of its spring, thereby preventing rear PTO shaft 24 from inertial idling unless PTO clutch 22 engages. When electromagnetic valve 66 is shifted leftward from the position shown in FIG. 7 by acting operation of a PTO clutch operating tool such as a lever or a pedal (not shown), oil is supplied into a chamber of PTO brake 69, thereby releasing the suppression of PTO brake 69 against PTO clutch 22, and afterward, PTO clutch 22 engages with a little delay by action of delay relief valve 68.

Figure 8:
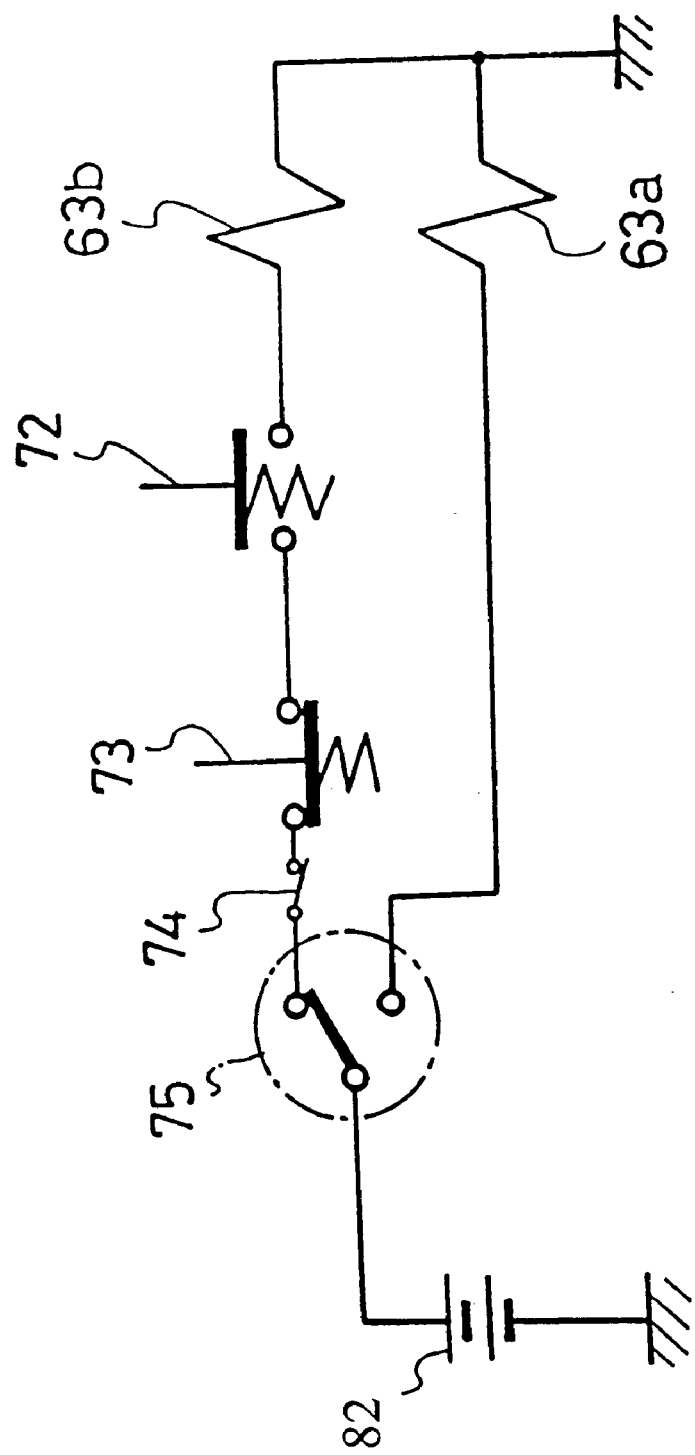
FIG. 8 is an electric circuit of the front-wheel driving control unit.

Next, explanation will be given on an electric circuit for controlling directional control valve 63 according to FIG. 8. A driving mode setting switch 75 is manually operable to connect with one of the two output terminals, a first output terminal and a second output terminal, so as to select the driving mode between 2WD and 4WD. The first output terminal is provided on a circuit for energizing a first solenoid 63a of directional control valve 63. The second output terminal is provided on a circuit, which comprises switches 72, 73 and 74 in series, for energizing a second solenoid 63b of directional control valve 63. Thus, the electric power from a battery 82 is readily applied to either first or second solenoid 63a or 63b through driving mode setting switch 75 according to an operator's setting of driving mode setting switch 75.

Regularly open switch 72 closes when each of the leftward and rightward rotational angles of front wheels 12 by steering operation of steering wheel 7 is beyond the predetermined angle (e.g., 35°). Regularly closed switch 73 is manually operated to open the circuit in case of steering without acceleration of front wheels 12. Switch 74 is automatically or manually operated to open the circuit in case of travelling on road and to close it in case of travelling on field.

Additionally, switch 72, if only being disposed on way of a linkage between steering wheel 7 and front wheel 12, is not limited in position. With regard to this embodiment, it is disposed beside a steering cylinder disposed on the upper portion of front axle casing 11 as shown in FIG. 1. Switch 72 may be replaced with a sensor for detecting the rotational angle of front wheel 12 itself, so that the circuit is closed by detection of the rotational angle beyond the predetermined angle.

Due to the above-mentioned construction, if driving mode setting switch 75 is put into 2WD mode position, first solenoid 63a is energized so as to shift directional control valve 63 to a second position II shown in FIG. 7. Pressure oil discharged from hydraulic pump 65 is thus supplied into second chamber C2 of first friction clutch 16 through oil conduit 60 and oil bore 48, so as to make first piston 46 slide rightward when viewed in FIG. 3, thereby releasing the pressure between friction plates 43 and 44. Thus, gear 42 is unconnected from front-wheel driving output shaft 40, whereby only rear wheels 14 are driven.

When driving mode setting switch 75 is put into 4WD mode position, unless the vehicle is steered beyond the predetermined angle, directional control valve 63 is set in a first position I as its neutral position because the circuit for second solenoid 63b is open by switch 72. In this state, pressure oil discharged from hydraulic pump 65 is supplied into first chamber C1 of first friction clutch 16 through oil conduit 61 and oil bore 49, thereby making first piston 46 slide leftward when viewed in FIG. 3 so as to press friction plates 43 and 44. Thus, gear 42 is connected with front-wheel driving output shaft 40, whereby the vehicle travels in F4WD mode, in other words, front wheels 12 are driven together with rear wheels 14 at a substantially equal peripheral speed.

During driving mode setting switch 75 set in 4WD mode position, once front wheels 12 have been steered beyond the predetermined angle, switch 72 closes the circuit so as to energize second solenoid 63b, thereby shifting directional control valve 63 to third position III. In this state, pressure oil from hydraulic pump 65 flows through oil conduit 62 and is divided into oil bore 55 and into oil bore 48 through check valve 76. Pressure oil from oil bore 48 is supplied into second chamber C2 of first friction clutch 16, so as to make first piston 46 slide, thereby releasing the pressure between friction plates 43 and 44. Simultaneously, pressure oil from oil bore 55 is supplied into third chamber C3 of second friction clutch 17, so as to make second piston 53 slide rightward when viewed in FIG. 3, thereby pressing friction plates 51 and 52. Thus, gear 50 is connected with front-wheel driving output shaft 40 so that the vehicle travels in S4WD mode, that is, front wheels 12 are driven faster than rear wheels 14.

In case of the circuit for energizing second solenoid 63*b* is open due to switch 73 or 74 during driving mode setting switch 75 set in 4WD mode, even if the vehicle is steered beyond the predetermined angle, second solenoid 63*b* is not energized, whereby directional control valve 63 stays in first position I. Hence, the vehicle travels in F4WD mode, or front wheels 12 are driven together with rear wheels 14 at a substantially equal peripheral speed.

Figure 9:
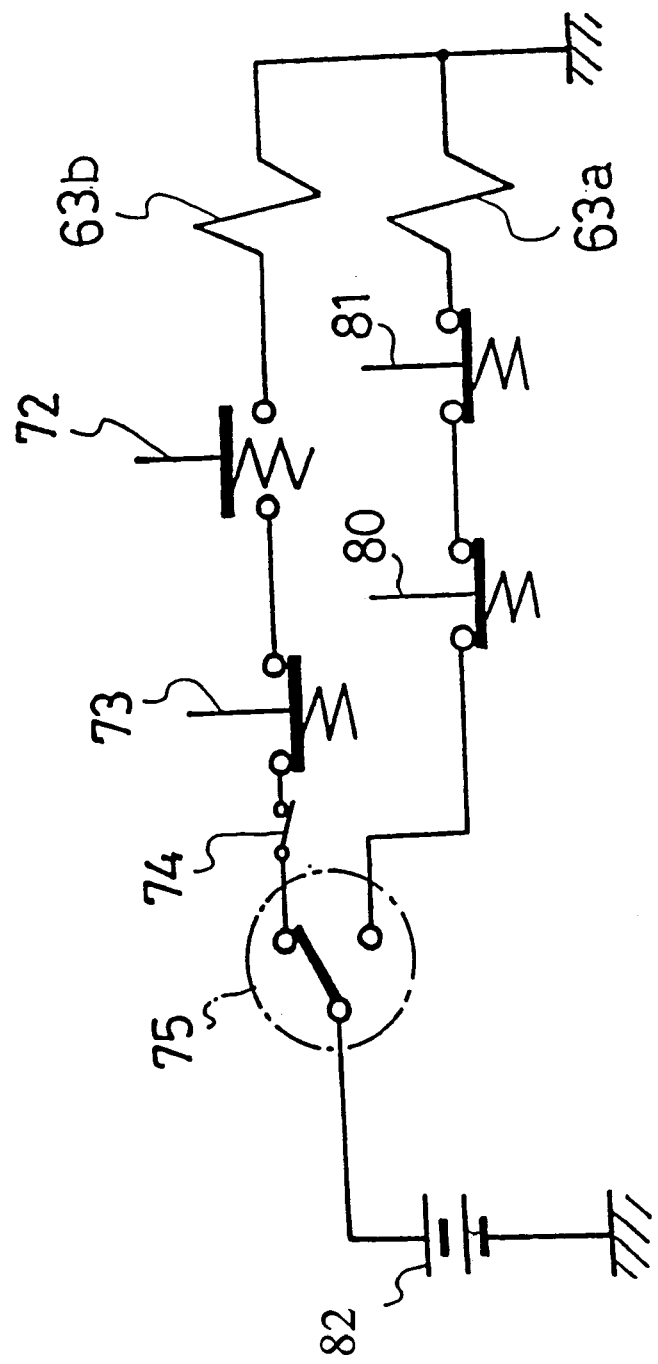
FIG. 9 is an alternative electric circuit of the front-wheel driving control unit according to another embodiment.

Alternatively, the electric circuit for directional control valve 63 may be constructed as shown in FIG. 9 so that directional control valve 63 is automatically shifted to first position I as soon as both the braking devices for braking left and right rear wheels 14 are operated for braking or the parking lock device is operated for locking.

In this regard, the circuit for energizing first solenoid 63*a* is provided with two switches 80 and 81 in series.

Switch 80 is regularly closed and remains closed when the braking devices for left and right rear wheels 14 act individually. It breaks the circuit only when both the braking devices act simultaneously. Switch 80 is operated to break the circuit by detecting that both the above-mentioned left and right turn brake pedals are trod simultaneously. Alternatively, in case that means connecting the left and right turn brake pedals with each other is provided on the vehicle, switch 80 may be operated similarly when it is detected that the means is operated to connect both the pedals. For example, a master brake pedal for operating both the braking devices may be provided on the vehicle, so that switch 80 breaks the circuit by detecting that the master brake pedal is trod.

Switch 81, is regularly closed and is opened by detecting that the parking lever or pedal is operated so as to lock both rear wheels 14 simultaneously for parking.

Hence, the circuit for energizing first solenoid 63*a* is broken by switch 80 or 81 when both rear wheels 14 are stopped simultaneously for braking or parking.

Due to this construction, during travelling in 2WD mode in state of directional control valve 63 set in second position II, if left and right rear wheels 14 are simultaneously braked for stopping the vehicle, switch 80 breaks the circuit so as not to energize first solenoid 63*a*, thereby making directional control valve 63 return to first position I. Thus, oil is drained from second chamber C2 and simultaneously supplied into first chamber C1, so that the hydraulic pressure from first chamber C1 together with the biasing force of biasing member 47 is applied to first friction clutch 16 so as to make it engage, thereby changing the driving mode into F4WD. Hence, the braking force to rear wheels 14 is also applied to front wheels 12, thereby reducing the braking distances of the vehicle. During braking of the vehicle, friction plates 43 and 44 of first friction clutch 16 are forcibly pressed against each other by first piston 46 and biasing member 47, whereby the braking force applied to rear wheels 14 steadily acts to front wheels 12 while preventing the vehicle from slipping.

In case of parking the vehicle in 2WD mode on a downhill while its engine is kept to drive, there is generated a tendency to rotate front wheels 12 to which the weight of the vehicle is applied. However, due to the construction as shown in FIG. 9, just operating the parking lever or pedal, the driving mode is changed from 2WD to F4WD, thereby making the locking force applied to rear wheels 14 also act to front wheels 12 steadily, so as to reduce the force to rotate front wheels 12. Hence, the vehicle can be prevented from slipping down the descent.

What is claimed is:

1. A four-wheel driven vehicle comprising front wheels, rear wheels, a rear-wheel driving system and a front-wheel driving system branching from an intermediate of said rear-wheel driving system, said front-wheel driving system including:

a first transmission for driving said front wheels at a peripheral speed substantially identical with that of said rear wheels;

a clutch casing supported onto a front wheel driving output shaft;

a first friction clutch disposed in said clutch casing, said first friction clutch being hydraulically operable to engage for connecting said first transmission with said rear-wheel driving system and to disengage for separating said first transmission from said rear-wheel driving system;

a first piston housed in said clutch casing for switching said first friction clutch, said first piston partitioning an interior space of said clutch casing into a first chamber and a second chamber along said front-wheel driving output shaft;

a biasing member disposed in said first chamber for biasing said first friction clutch toward engagement with a friction plate disposed in said second chamber; and a directional control valve changeable between a first position for supplying fluid into said first chamber and a second position for supplying fluid into said second chamber, wherein when said directional control valve is put into said first position, said first piston is acted to make said first friction clutch engage by the hydraulic pressure through said first chamber in addition to the biasing force of said biasing member, and when said directional control valve is put into said second position, said first piston is acted to make said first friction clutch disengage against the biasing force of said biasing member by the hydraulic pressure through said second chamber.

2. A four-wheel driven vehicle as set forth in claim 1, further comprising:

a solenoid provided to said directional control valve, wherein said solenoid is energized so as to put said directional control valve into said second position, and unless said solenoid is energized, said direction control valve stays in said first position.

3. A four-wheel driven vehicle as set forth in claim 1, further comprising:

a driving mode setting means for selecting the driving mode between a two-wheel drive mode and a four-wheel drive mode, wherein when said driving mode setting means is set into said two-wheel drive mode, said directional control valve is put into said second position.

4. A four-wheel driven vehicle as set forth in claim 3, further comprising:

braking means for braking both said left and right rear wheels simultaneously provided to said rear-wheel driving system, and detecting means for detecting whichever said braking means brakes said left and right rear wheels or not, wherein when said detecting means detects that said braking means brakes both of said left and right rear wheels, said directional control valve is put into said first position even if said driving mode setting means is set in two-wheel drive mode.

5. A four-wheel driven vehicle as set forth in claim 1, wherein said front-wheel driving system further comprises:
   a second transmission for driving said front wheels at a peripheral speed higher than that of said rear wheels;
   a second friction clutch disposed in said clutch casing opposite said first friction clutch, said second friction clutch being hydraulically operable to engage for connecting said second transmission with said rear-wheel driving system and to disengage for separating said second transmission from said rear-wheel driving system;
   a second piston for switching said second friction clutch; and
   a third chamber disposed at one side of said second piston, so that said directional control valve is changeable to a third position for supplying fluid into said second and third chambers in addition to said first position and said second position, whereby when said directional control valve is put into said third position, said first piston is acted to make said first friction clutch disengage by the hydraulic pressure through said second chamber and said second piston is acted to make said second friction clutch engage by the hydraulic pressure through said third chamber.

6. A four-wheel driven vehicle as set forth in claim 5, further comprising:
   a first solenoid and a second solenoid provided to said directional control valve, wherein said first solenoid is energized so as to put said directional control valve into said second position, said second solenoid is energized so as to put said directional control valve into said third position, and unless either said first solenoid or second solenoid is energized, said direction control valve stays in said first position.

7. A four-wheel driven vehicle as set forth in claim 5. further comprising:
   a driving mode setting means for selecting the driving mode between a two-wheel drive mode and a four-wheel drive mode, wherein when said driving mode setting means is set into said two-wheel drive mode, said directional control valve is put into said second position.

8. A four-wheel driven vehicle as set forth in claim 7, further comprising:
   braking means for braking both said left and right rear wheels simultaneously provided to said rear-wheel driving system, and
   detecting means for detecting whichever said braking means brakes said left and right rear wheels or not, wherein when said detecting means detects that said braking means brakes both of said left and right rear wheels, said directional control valve is put into said first position even if said driving mode setting means is set in two-wheel drive mode.

9. A four-wheel driven vehicle as set forth in claim 7, further comprising:
   detecting means for detecting the steering angle of said front wheels, wherein while said driving mode setting means is set in four-wheel drive mode, unless said detecting means detects that the steering angle of said front wheels is beyond a predetermined angle, said directional control valve is put into said first position, and once said detecting means has detected that the steering angle of said front wheels is beyond the predetermined angle, said directional control valve is put into said third position.

10. A four-wheel driven vehicle comprising front wheels, rear wheels, a rear-wheel driving system and a front-wheel driving system branching from an intermediate of said rear-wheel driving system, said front-wheel driving system including:
    a first transmission for driving said front wheels at a peripheral speed substantially identical with that of said rear wheels;
    a first friction clutch which is hydraulically operable to engage for connecting said first transmission with said rear-wheel driving system and to disengage for separating said first transmission from said rear-wheel driving system;
    a first piston for switching said first friction clutch;
    a first chamber disposed at one side of said first piston;
    a biasing member disposed in said first chamber for biasing said first friction clutch toward engagement;
    a second chamber disposed at the other side of said first piston;
    a directional control valve changeable between a first position for supplying fluid into said first chamber and a second position for supplying fluid into said second chamber, wherein when said directional control valve is put into said first position, said first piston is acted to make said first friction clutch engage by the hydraulic pressure through said first chamber in addition to the biasing force of said biasing member, and when said directional control valve is put into said second position, said first piston is acted to make said first friction clutch disengage against the biasing force of said biasing member by the hydraulic pressure through said second chamber;
    a second transmission for driving said front wheels at a peripheral speed higher than that of said rear wheels;
    a second friction clutch which is hydraulically operable to engage for connecting said second transmission with said rear-wheel driving system and to disengage for separating said second transmission from said rear-wheel driving system;
    a second piston for switching said second friction clutch; and
    a third chamber disposed at one side of said second piston, so that said directional control valve is changeable to a third position for supplying fluid into said second and third chambers in addition to said first position and said second position, whereby when said directional control valve is put into said third position, said first piston is acted to make said first friction clutch disengage by the hydraulic pressure through said second chamber and said second piston is acted to make said second friction clutch engage by the hydraulic pressure through said third chamber.

11. A four-wheel driven vehicle as set forth in claim 10, further comprising:
    a first solenoid and a second solenoid provided to said directional control valve, wherein said first solenoid is energized so as to put said directional control valve into said second position, said second solenoid is energized so as to put said directional control valve into said third position, and unless either said first solenoid or second solenoid is energized, said direction control valve stays in said first position.

12. A four-wheel driven vehicle as set forth in claim 10, further comprising:

a driving mode setting means for selecting the driving mode between a two-wheel drive mode and a four-wheel drive mode, wherein when said driving mode setting means is set into said two-wheel drive mode, said directional control valve is put into said second position.

13. A four-wheel driven vehicle as set forth in claim 12, further comprising:

braking means for braking both said left and right rear wheels simultaneously provided to said rear-wheel driving system, and detecting means for detecting whichever said braking means brakes said left and right rear wheels or not, wherein when said detecting means detects that said braking means brakes both of said left and right rear wheels, said directional control valve is put into said first position even if said driving mode setting means is set in two-wheel drive mode.

14. A four-wheel driven vehicle as set forth in claim 12, further comprising:

detecting means for detecting the steering angle of said front wheels, wherein while said driving mode setting means is set in four-wheel drive mode, unless said detecting means detects that the steering angle of said front wheels is beyond a predetermined angle, said directional control valve is put into said first position, and once said detecting means has detected that the steering angle of said front wheels is beyond the predetermined angle, said directional control valve is put into said third position.

* * * * *

UNITED STATES PATENT AND TRADEMARK OFFICE
CERTIFICATE OF CORRECTION

PATENT NO. : 6,199,653 B1
DATED : March 13, 2001
INVENTOR(S) : Matsufuji et al.

It is certified that error appears in the above-identified patent and that said Letters Patent is hereby corrected as shown below:

Claim 4, column 11,
Line 4, delete "whichever" and insert -- whether -- therefor.

Claim 8, column 11,
Line 57, delete "whichever" and insert -- whether -- therefor.

Claim 13, column 13,
Line 19, delete "whichever" and insert -- whether -- therefor.

Signed and Sealed this

Thirtieth Day of October, 2001

*Attest:*

NICHOLAS P. GODICI
*Attesting Officer*     *Acting Director of the United States Patent and Trademark Office*